US011523277B2

(12) United States Patent
Rajadurai

(10) Patent No.: US 11,523,277 B2
(45) Date of Patent: Dec. 6, 2022

(54) METHOD OF DYNAMICALLY PROVISIONING A KEY FOR AUTHENTICATION IN RELAY DEVICE

(71) Applicant: Samsung Electronics Co., Ltd., Suwon-si (KR)

(72) Inventor: Rajavelsamy Rajadurai, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/946,271

(22) Filed: Jun. 12, 2020

(65) Prior Publication Data
US 2020/0396611 A1 Dec. 17, 2020

(30) Foreign Application Priority Data

Jun. 14, 2019 (IN) .............................. 201941023707
Jun. 1, 2020 (IN) .............................. 201741023707

(51) Int. Cl.
*H04L 29/06* (2006.01)
*H04W 12/069* (2021.01)

(52) U.S. Cl.
CPC ................................. *H04W 12/069* (2021.01)

(58) Field of Classification Search
CPC ..... H04L 9/08; H04L 63/0853; H04L 63/205; H04L 63/06; H04L 63/062; H04L 63/064; H04W 12/069
See application file for complete search history.

(56) References Cited

U.S. PATENT DOCUMENTS

2012/0163336 A1* 6/2012 Adjakple .......... H04W 36/0033
370/331
2013/0344823 A1* 12/2013 Almgren ................ H04K 3/226
455/90.1
(Continued)

FOREIGN PATENT DOCUMENTS

CN 102595403 A 7/2012
IL WO 2018/170061 * 9/2018 ............ H04W 12/02
(Continued)

OTHER PUBLICATIONS

"Security architecture and procedures for 5G system" Release 15, 3GPP TS 33.501 V15.4.0, Mar. 2019, pp. 1-187. (Year: 2019).*
(Continued)

*Primary Examiner* — Joseph P Hirl
*Assistant Examiner* — Chi D Nguy

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Embodiments herein provide a method for authentication by dynamically generating security credentials in plug and play scenarios without a pre-configuration of F1 security credentials at an integrated access and backhaul (IAB) relay device in a wireless network. The method includes generating, by the IAB relay device, a stratum security key for one of an access stratums (AS) security establishment and a non-access stratums (NAS) security establishment with an IAB donor device in the wireless network. Further, the method includes generating, by the (Continued)

IAB relay device, a pre-shared key (PSK) based on the stratum security key. Further, the method includes generating an Internet Key Exchange (IKE) value using the PSK for establishing an F1 interface security with the IAB donor device.

15 Claims, 9 Drawing Sheets

(56) References Cited

U.S. PATENT DOCUMENTS

| | | |
|---|---|---|
| 2017/0006499 A1 | 1/2017 | Hampel et al. |
| 2018/0213403 A1 | 7/2018 | Shi |
| 2019/0007236 A1* | 1/2019 | Ishii .................... H04L 12/4633 |

FOREIGN PATENT DOCUMENTS

| | | | | |
|---|---|---|---|---|
| SE | WO 2020/151798 | * | 7/2020 | ............ H04W 36/10 |
| WO | 2017/004253 A1 | | 1/2017 | |

OTHER PUBLICATIONS

"3rd Generation Partnership Project; Technical Specification Group Services and System Aspects; Study on Security for NR Integrated Access and Backhaul; (Release 16)", 3GPP TR 33.824 V0.2.0 (May 2019), 17 pages.

"Digital cellular telecommunications system (Phase 2+)(GSM); Universal Mobile Telecommunications System (UMTS); LTE; 3GPP System Architecture Evolution (SAE); Security architecture (3GPP TS 33.401 version 15.7.0 Release 15)", ETSI TS 133 401 V15.7.0 (May 2019), 166 pages.

Huawei, "Overview on Support of IAB", 3GPP TSG-RAN WG3#99, Feb. 26-Mar. 2, 2018, R3-180815, 5 pages.

RAN WG2, "LS on IAB security", 3GPP TSG RAN WG2#104, Nov. 12-16, 2018, R2-1818748, 4 pages.

"3rd Generation Partnership Project; Technical Specification Group Services and System Aspects; Study on Security for NR Integrated Access and Backhaul; (Release 16)", 3GPP TR 33.824 V0.3.0 (Jun. 2019), 21 pages.

Samsung, "Establishment of F1 security association using Shared Key", 3GPP TSG-SA WG3 Meeting #95Bis, Jun. 24-28, 2019, S3-192202, 3 pages.

Samsung, "Security framework for the NR integrated access backhaul", 3GPP TSG-SA WG3 Meeting #94, Jan. 28-Feb. 1, 2019, S3-190357, 6 pages.

European Search Report dated Sep. 21, 2020 in connection with European Patent Application No. 20 17 9722, 14 pages.

International Search Report dated Sep. 11, 2020 in connection with International Patent Application No. PCT/KR2020/007677, 3 pages.

Samsung, "Establishment of F1 security association using Shared Key," S3-192202 revision of S3-19xabc, 3GPP TSG-SA WG3 Meeting #95bis, Sapporo, Japan, Jun. 24-28, 2019, 3 pages.

Intellectual Property India, "Examination report under sections 12 & 13 of the Patents Act" dated Nov. 8, 2021, in connection with counterpart Indian Patent Application No. 201941023707, 5 pages.

* cited by examiner

FIG. 8
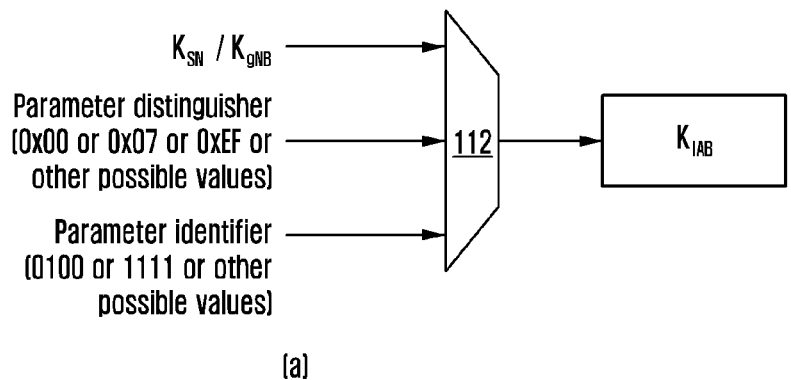
(a)
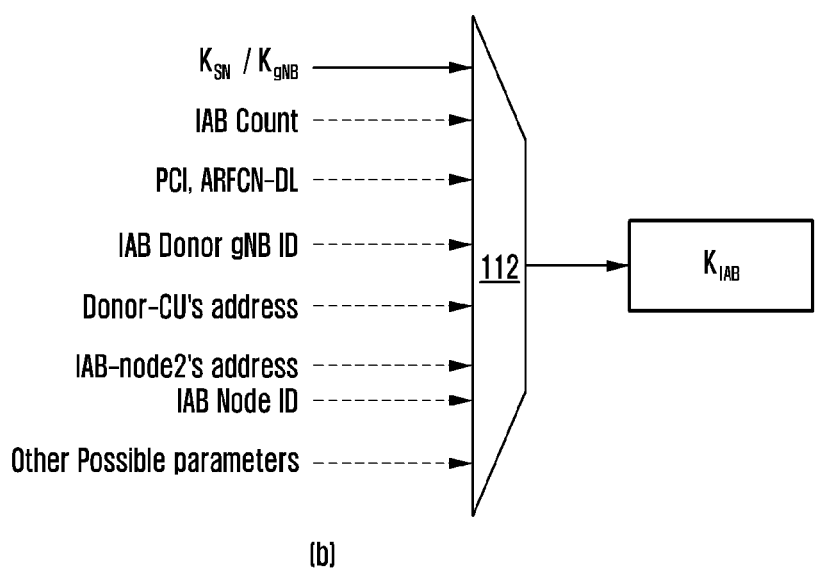
(b)
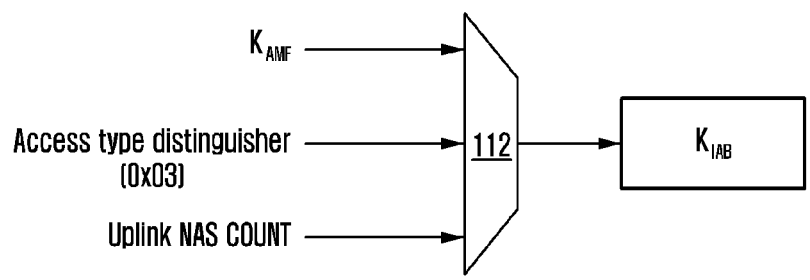
(c)
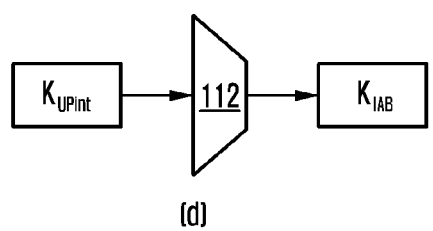 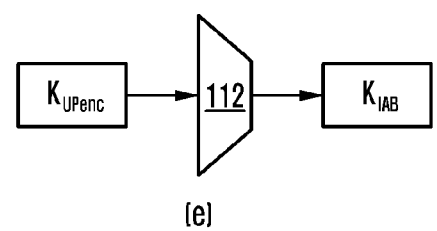
(d) (e)

METHOD OF DYNAMICALLY PROVISIONING A KEY FOR AUTHENTICATION IN RELAY DEVICE

CROSS-REFERENCE TO RELATED APPLICATIONS

This application is based on and claims priority under 35 U.S.C. § 119 of an Indian Provisional Patent Application Number 201941023707, filed on Jun. 14, 2019, in the Indian Patent Office, and an Indian Non-Provisional Patent application number 201941023707, filed on Jun. 1, 2020, in the Indian Patent Office, the disclosure of each of which is incorporated by reference herein in its entirety.

BACKGROUND

1. Field

The present disclosure relates to electronic devices, and more specifically to a method and integrated access and backhaul (IAB) relay device for dynamically provisioning a key for an internet key exchange (IKE) v2 pre-shared key (PSK) authentication.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Wireless backhaul and relay links are required for deployment of a faster 5G network. The wireless backhaul and relay links enable flexible and dense deployment of NR cells and radio extension without densification of a transport network. The wireless backhaul and relay links are implemented using integrated access backhaul (IAB) devices. FIG. 1A-1B illustrate a network architecture of the IAB, according to a prior art. An IAB donor device is connected to components of a core network such as a gNB through an Xn interface, an access and mobility management function (AMF) or user plane function (UPF) through NG interface, etc. The IAB donor (i.e., IAB donor device) is a next-generation radio access network (NG-RAN) node that supports IAB feature and provides connection to the core network to IAB-nodes.

The IAB donor supports a control unit (CU) functionality of a control unit/distribution unit (CU/DU) architecture for IAB defined in next generation-radio access network (NG-RAN) specification. The IAB node (i.e., IAB relay device) is a relay node that supports wireless in-band and out-of-band relaying of a NR access traffic via NR Uu backhaul links. The IAB relay device supports a user equipment (UE) functionality and a distribution unit (DU) functionality of the CU/DU architecture for IAB defined in NG-RAN specification. The CU functionality of the IAB donor device allows the IAB donor device operates as a typical gNB. The DU functionality of the IAB donor device allows the IAB donor to provide an NR backhaul link to the IAB relay device through an F1 interface. The NR backhaul link operates as a typically NR link used for backhauling between the IAB donor device and the IAB relay device, and between the IAB relay devices in case of a multi-hop network.

The part of the IAB relay device that supports a Uu interface towards the IAB donor device or another parent IAB relay device is referred to as an IAB-UE (or IAB-MT). The backhaul connectivity of the IAB relay device or the IAB donor device or another parent IAB relay device with a public land mobile network (PLMN) is managed through the Uu interface. The DU (or gNB-DU) functionality in the IAB relay device is responsible for providing a NR Uu access to UEs and child IAB-nodes. The corresponding gNB-CU functionality resides on the IAB donor gNB, which controls IAB-node gNB-DU via the F1 interface. The IAB relay device appears as a normal gNB to the UEs and the other IAB-nodes and allows them to connect to the 5GC. The UE or mobile terminal (MT) functionality of the IAB relay device allows the IAB relay device to operate as a radio access network (RAN) node. A DU functionality of the IAB relay device allows a user equipment (UE) to connect to the IAB relay device. The DU functionality of the IAB relay device together with the CU functionality on the IAB donor device provides an access to the core network to a child IAB relay devices and the UE in a southbound direction. The IAB relay device connects to the IAB donor device or parent IAB relay devices using the MT functionality through a NR Uu interface. The IAB relay device receives data from the core network using the DU functionality of the IAB devices through the NR backhaul link. The Uu backhaul links can exist between the IAB relay device and a gNB referred to as IAB donor device or the another IAB node relay device.

The IAB relay device access the core network by operating either in a new radio standalone (NR-SA) mode or new radio non-standalone (NR-NSA) mode (i.e., E-UTRAN new radio-dual connectivity (EN-DC) mode). FIG. 2 illustrates a SA based integration of a new IAB relay device to the core network, according to a prior art. The SA based integration of a new IAB relay device to the core network includes three phases, i.e., phase 1, phase 2, and phase 3.

Phase 1: The UE/MT functionality of the new IAB relay device connects to the core network as the normal UE, by performing a RRC connection setup procedure with the CU functionality of the IAB donor device, authentication with the core network, a context management related to the new IAB relay device, an access traffic-related radio bearer configuration for the new IAB relay device at the RAN, and optionally an operations, administration and maintenance (OAM) connectivity establishment.

Phase 2: As part of the phase 2, two steps are performed, 1) backhaul radio link control (RLC) channel establishment and 2) routing update. In the phase 2-1: backhaul RLC channel establishment, a backhaul RLC channel is established for CP traffic in the phase 2-1. For example, F1-C messages (i.e., the messages sending through the F1 interface) transporting to and from the IAB relay device are established in the phase 2-1. In the phase 2-2: routing update, the backhaul adaptation protocol (BAP) layer is updated in the phase 2-2 to support routing between the new IAB relay device and the DU functionality of the IAB donor device. Updating the BAP layer includes configuring a BAP routing identifier for routing in downstream direction on the DU functionality of the IAB donor, and a BAP route identifier in upstream direction on the MT functionality of the IAB relay device. Further, routing tables are updated for all parent IAB relay devices and the DU functionality of the IAB donor device with routing entries for the new BAP routing identifier. Further, the DU functionality of the new IAB relay device configures an IP address to establish IP connectivity to the core network.

Phase 3: the DU (gNB-DU) functionality of the IAB relay device is configured in the phase 3 i.e., IAB-DU part setup. The DU functionality of the IAB relay device initiates the setting up an F1-C connection (i.e., a link through the F1 interface) with the CU functionality of the IAB donor device. The IAB relay device starts serving the UE after setting up the link through the F1 interface.

An independent authentication mechanism using internet key exchange value (e.g., IKEv2) is performed in the phase 3 for a secure F1 interface establishment using an internet protocol security (IPsec) establishment. Since, the MT functionality and the DU functionality of the IAB node are independent, both the functionalities perform independent authentication between the IAB relay device and the core network for establishing independent security contexts. Since to preform independent authentication by each functionality, multiple credentials (for example, for UE functionality (Uu interface) AKA credentials and for DU functionality (F1 interface) private key and Certificate) are required at the core network and the IAB relay device, which leads to increase manufacturing cost as well as management efforts. Further, preforming independent authentication leads to an overhead in performing multiple redundant authentications for no security gains.

Further, preforming independent authentication leads to increase the latency in setting up a secure F1 interface. Further, a manually configuring security credentials (e.g., pre-configured certificates, pre-shared key (PSK)) which are re-used for the authentication procedures for a long time, until the credentials are being updated. Hence, operations, administration and maintenance (OAM) infrastructure is also needed to configure fresh credentials for avoiding possibly re-using the same key. Further, pre-configuration has a limitation in scenarios like in mission critical (e.g., disaster) scenarios and locations or a temporary events like sports, as the IAB donor device of that location needs security configuration to establish the F1 secure interface, but it is critical to enable support of ad-hoc and temporary IAB relay devices without any OAM pre-configurations. Thus, it is desired to address the above-mentioned shortcomings or at least provide a useful alternative.

SUMMARY

Objects of the embodiments herein are to provide a method and an IAB relay device for authentication and dynamically generate the PSK for the IKEv2 PSK authentication, as to avoid a pre-configuration of security credentials, which is comparatively weaker.

Another object of the embodiments herein is to generate a stratum security key at the IAB relay device in a wireless network by authenticating with the IAB donor device or AMF of the wireless network using a UE functionality of the IAB relay device.

Another object of the embodiments herein is to generate the stratum security key for a security establishment with the IAB donor device.

Another object of the embodiments herein is to generate a Pre-Shared Key (PSK) based on the stratum security key.

Another object of the embodiments herein is to generate an IKEv2 value using the PSK for establishing an F1 interface security with the IAB donor device.

Another object of the embodiments herein is to establish the F1 interface security with the IAB donor device by skipping an authentication procedure that uses a pre-configured security credential.

Accordingly, the embodiments herein provide a method for authentication at an IAB relay device in a wireless network. The method includes generating, by the IAB relay device, a stratum security key for one of an access stratums (AS) security establishment and a non-access stratums (NAS) security establishment with an IAB donor device in the wireless network. Further, the method includes generating, by the IAB relay device, a PSK based on the stratum security key. Further, the method includes generating an IKEv2 value using the PSK for establishing an F1 interface security with the IAB donor device.

In an embodiment, where a base station in the wireless network provides a security key of a MT functionality of the IAB relay device to the IAB donor device for generating the stratum security key, when the IAB relay device connects to the IAB donor device through a handover from the base station.

In an embodiment, where the IAB relay device performs the authentication with the IAB donor device using the MT functionality of the IAB relay device for generating the stratum security key, when the IAB relay device connects to the IAB donor device after a powering up or for a registration/attach procedure.

In an embodiment, where the MT functionality of the IAB relay device provides the PSK to a DU functionality of the IAB relay device in response to generating the PSK.

In an embodiment, where establishing the F1 interface security with the IAB donor device, includes generating, by the IAB donor device, the stratum security key for the AS security establishment, generating, by the IAB donor device, the PSK based on the stratum security key for the AS security establishment, and generating, by the IAB donor device, the IKE value using the PSK for establishing the F1 interface security with the IAB relay device.

In an embodiment, where establishing the F1 interface security with the IAB donor device, includes generating, by an AMF of the wireless network, the stratum security key for the NAS security establishment, generating, by the AMF, the PSK based on the stratum security key for the NAS security establishment, sending, by the AMF, the PSK to the IAB donor device, generating, by the IAB donor device, the IKE value using the PSK for establishing the F1 interface security with the IAB relay device, in response to receiving the PSK.

In an embodiment, where the stratum security key is an AS security key and a NAS security key for the AS establishment and the NAS security establishment, respectively.

In an embodiment, where the PSK is generated using at least one of a KSN, a KgNB, a S-KgNB, a KAMF, an IAB count, a physical cell identifier (PCI), an absolute radio frequency channel number-downlink (ARFCN-DL), a gNB identifier of the IAB donor device, an address of a control unit (CU) of the IAB donor device, an address of the IAB relay device, an identifier of the IAB relay device, a cell identifier, a key for user plane encryption (KUPenc), a key for user plane integrity (KUPint), an access type distinguisher, an uplink NAS count and other possible parameters.

In an embodiment, where the IAB relay device establishes the F1 interface security with the IAB donor device by skipping an authentication procedure that uses a pre-configured security credential.

Accordingly, the embodiments herein provide an IAB relay device for authentication. The IAB relay device includes a memory, a processor, and an authentication controller, where the processor is coupled to the memory. The authentication controller is coupled to the processor. The authentication controller is configured to generate a stratum security key for one of an AS security establishment and a NAS security establishment with an IAB donor device in a wireless network. The authentication controller is configured to generate a PSK based on the stratum security key. The authentication controller is configured to generate an IKE value using the PSK for establishing an F1 interface security with the IAB donor device.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF FIGURES

This method and apparatus illustrated in the accompanying drawings, throughout which like reference letters indicate corresponding parts in the various figures. The embodiments herein will be better understood from the following description with reference to the drawings, in which:

FIG. 8 illustrates example scenarios of generating a PSK using various parameters according to an embodiment as disclosed herein.

DETAILED DESCRIPTION

Figure 1A:
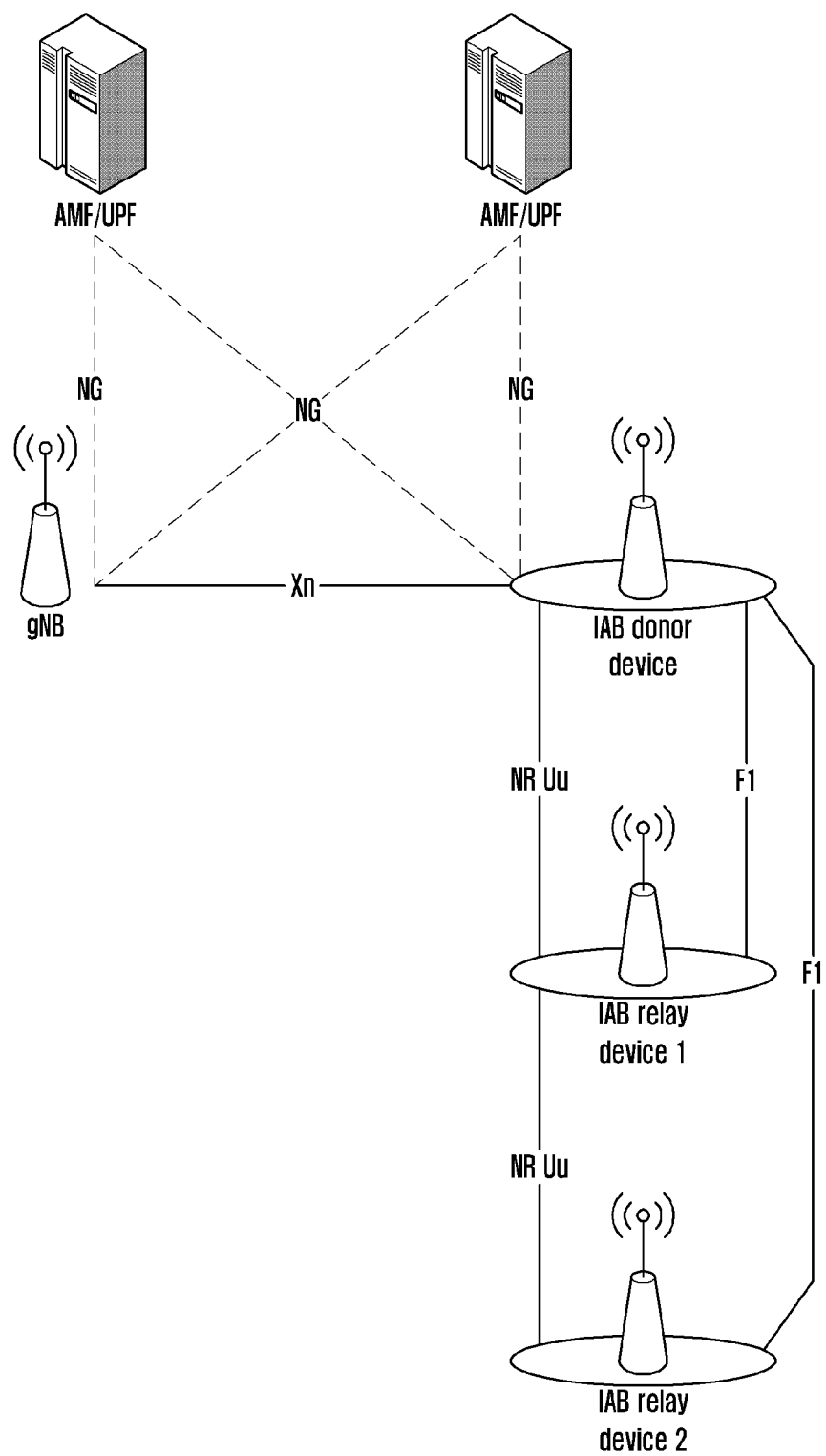
FIGS. 1A and 1B illustrate a network architecture of IAB devices.
Figure 1B:
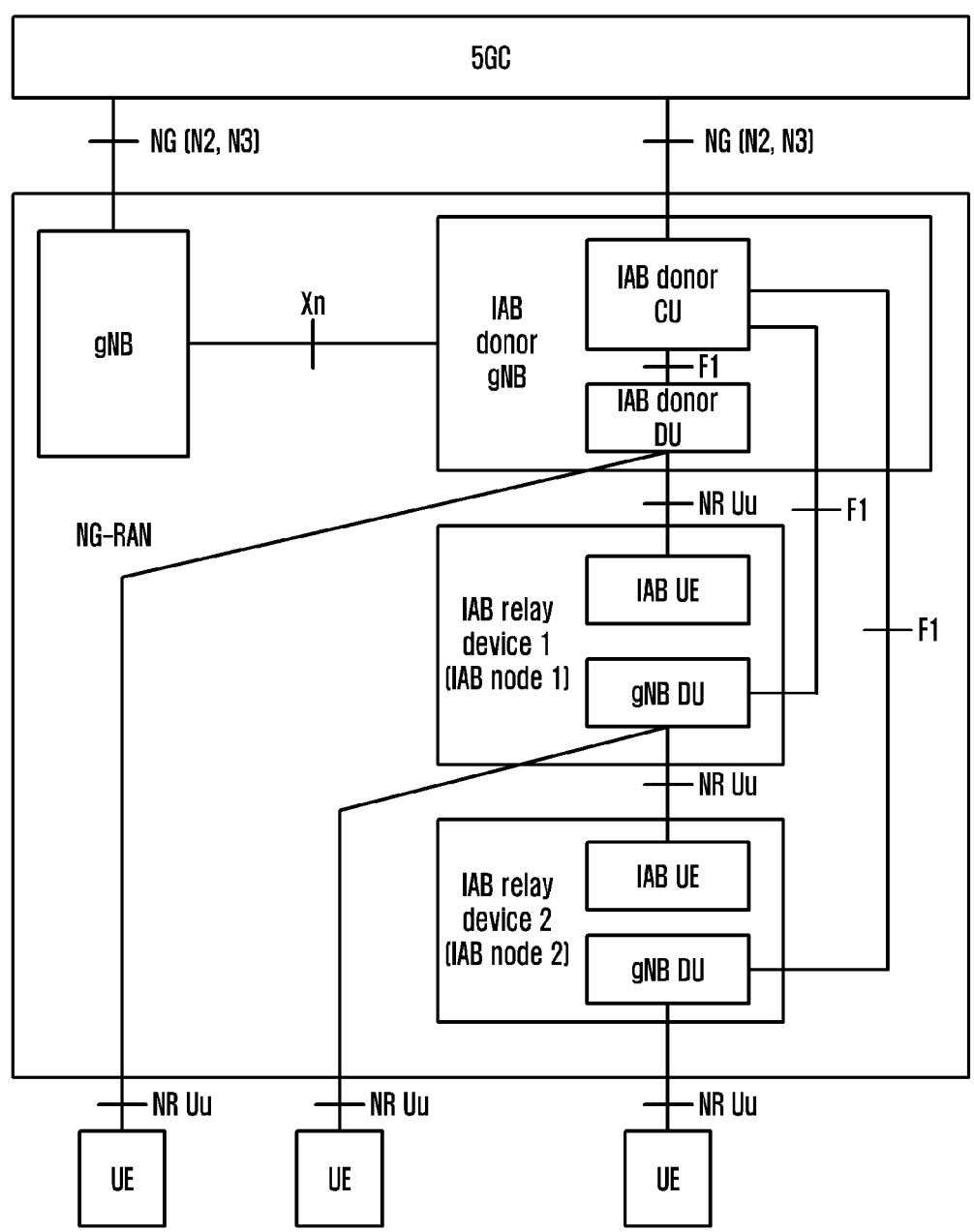
Figure 2:
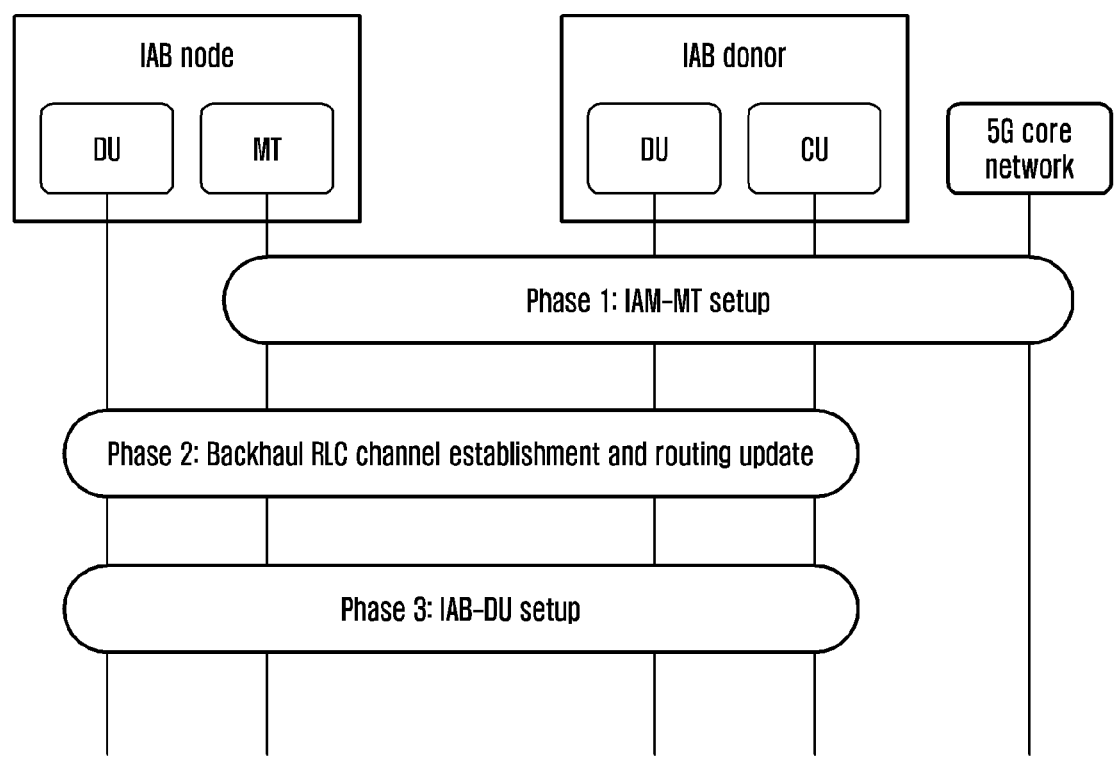
FIG. 2 illustrates a standalone based integration of a new IAB relay device to a core network.

FIGS. 1A through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments.

The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein. The term "KgNB" also means "S-KgNB" or "KSN," when considering a dual connectivity architecture and used interchangeably throughout this document. Further, the term "Base Station" may also be an "IAB donor device," when the IAB-node connects to a 5GC or a gNB or an eNB. The term "IAB donor device" or "IAB-donor" or "IAB-donor gNB" means the same and are used interchangeably throughout the document. The term "IAB relay device" or "IAB-node" means the same and are used interchangeably throughout the document. Further the term "MT function" and "IAB-UE function" in an IAB relay devices are the same and are used interchangeably throughout the document.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Embodiments herein provide a method for authentication by dynamically generating security credentials (i.e., Pre-Shared Key (PSK)) in plug and play scenarios without a pre-configuration of F1 security credentials at an integrated access and backhaul (IAB) relay device (100) in a wireless network. The benefit of the dynamically generated PSK is future proof, every installation may have an independent cryptographically generated key, which is automatically computed, and there is no procedure needed to provisioning or configuring the PSK.

For every deployment or re-start of the IAB node, the key may be fresh. Only network access credentials are required for the IAB-node to complete the IAB integration procedure, whereas pre-configuration credentials require additional credentials. Mechanism for dynamic key derivation and provisioning is addressed by this disclosure, whereas pre-configuration of security credentials (for example, certificate) requires additional entities and procedures for provisioning in the IAB-node and also in the IAB-donor. Independent unique PSK is derived for every IKEv2 authentication, whereas pre-configuration uses the same credentials for every IKEv2 authentication.

The method includes generating, by the IAB relay device, a stratum security key for one of an access stratums (AS) security establishment and a non-access stratums (NAS) security establishment with an IAB donor device in the wireless network. Further, the method includes generating, by the IAB relay device, the PSK based on the stratum security key. Further, the method includes generating an internet key exchange (IKE) version 2 AUTH value using the PSK for performing mutual authentication and establishing an F1 interface security with the IAB donor device.

Conventionally, the IAB relay device performs independent authentications using the IAB-UE functionality and the DU (i.e., gNB-DU in the IAB-node) functionality. Unlike conventional methods and systems, the provided method allows the IAB relay device to perform an independent authentication using the MT functionality and derives NAS and AS security keys. The NAS/AS stratum security key is used to derive the PSK, where the PSK is further used to compute the AUTH value (i.e., IKEv2 value) directly.

Thus, the authentication procedures such as EAP-TLS, EAP-AKA, or authentication using a pre-configured credentials such as a certificate, a (static) pre-configured PSK etc. is skipped/replaced for establishing the F1 interface security. Thus, the authentication and establishment of RRC security and IPsec are optimized without compromising a level of security. Therefore, the management effort of authentication is reduced by possessing only single credential for authentications using the MT functionality. Further, an overhead in performing multiple redundant authentications at the IAB relay device is reduced by implementing the provided method. Further, the latency is reduced in setting up a secure F1 interface. In an embodiment, a support for a dynamic PSK capability is indicated by the IAB relay device in a UE capability exchange procedure.

In an embodiment, the network enforces a use of the dynamic PSK by pre-configuring a policy to use the dynamic PSK for the IKEv2 authentication in the IAB donor device and in the IAB relay device, for example, using OAM procedure or using manual configuration, like so. In another embodiment, the IAB relay device indicates it used the dynamic PSK for the AUTH value generation in a vendor ID payload. In an another embodiment, when the IKEv2 performs a PSK authentication using the dynamic PSK, in a IKE_AUTH request message, the IAB node can set an ID type to ID_KEY_ID and set a value to a reserved value, which is known to the IAB donor device and in the IAB relay device.

Referring now to the drawings, and more particularly to FIGS. 3 through 8, there are shown preferred embodiments.

Figure 3:
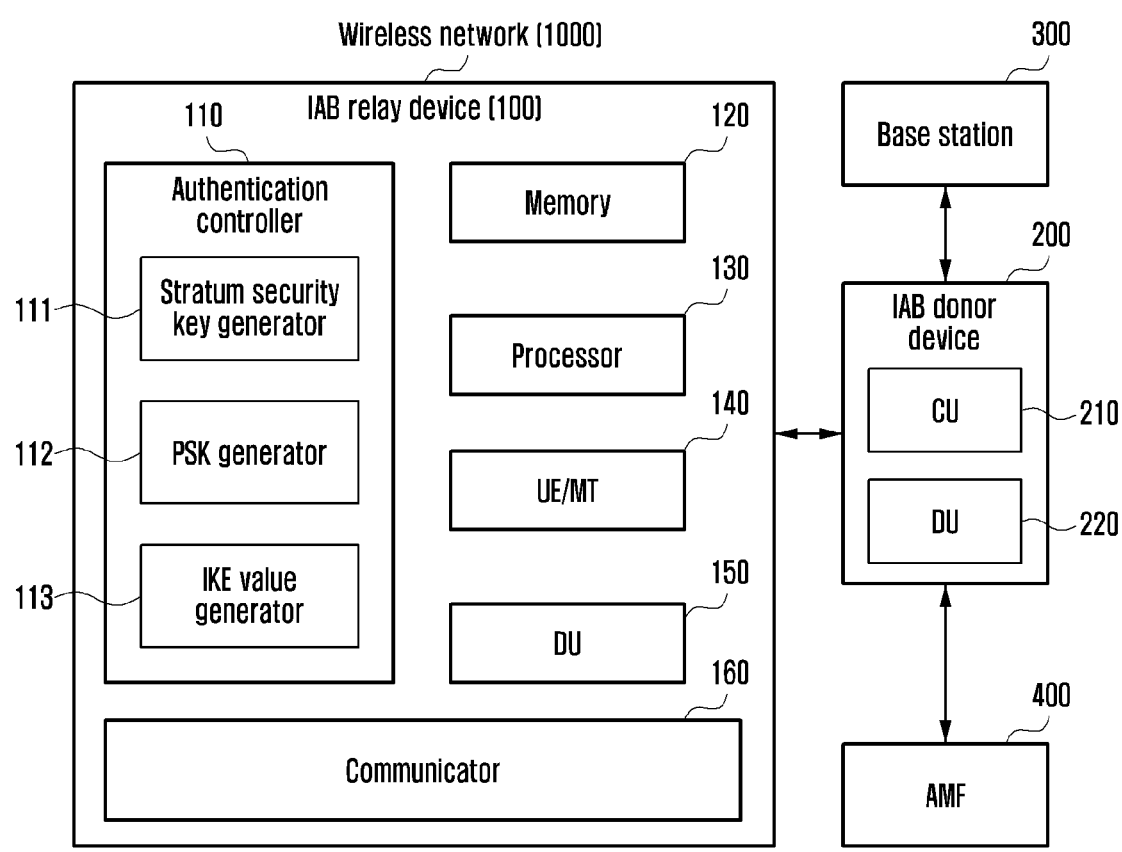
FIG. 3 illustrates a block diagram of an IAB relay device in the wireless network for generating and using a dynamic PSK without using a pre-configuration of security credentials for establishment of a secure F1 interface according to an embodiment as disclosed herein.

FIG. 3 illustrates a block diagram of an IAB relay device (100) in a wireless network (1000) for generating and using a dynamic PSK without using a pre-configuration of security credentials for establishment of the secure F1 interface, according to an embodiment as disclosed herein. In an embodiment, the wireless network (1000) includes the IAB relay device (100), an IAB donor device (200), a base station (300) and an Access and Mobility Management Function (AMF) (400). The base station (300) and the AMF (400) are components of a core network (not shown in the figures) of the wireless network (1000). In an embodiment, the base station (300) can be the IAB donor device (200) or a gNB or an eNB. In an embodiment, the IAB donor device (200) includes a central unit (CU) functionality (210) and a distribution unit (DU) functionality (220). Throughout this disclosure, the terms "CU functionality (210)" and "CU (210)" means the same and are used interchangeably. Throughout this disclosure, the terms "DU functionality (220)" and "DU (220)" are used interchangeably and means the same. The IAB donor device (200) is connected to at least one of base station (300) and an AMF (400).

In an embodiment, the IAB relay device (100) includes an authentication controller (110), a memory (120), a processor (130), a mobile terminal (MT) functionality (140), a DU functionality (150) and a communicator (160). Throughout this disclosure, the terms "MT functionality (140)," "UE functionality (140)," "UE (140)" and "MT (140)" are used interchangeably and means the same. Throughout this disclosure, the terms "DU functionality (150)," "gNB-DU (150)" and "DU (150)" are used interchangeably. In an embodiment, the authentication controller 110 includes a stratum security key generator (111), a PSK generator (112) and an IKE value generator (113). In an embodiment, the stratum security key generator (111), a PSK generator (112) uses a key derivation function (KDF), whereas the IKE value generator (113) uses pseudo-random function (PRF). An example for the KDF is a HMAC-SHA-256. Examples for the PRF are AES-XCBC-PRF-128, AES-CMAC-PRF-128, PRF_HMAC_MD5_PRF_HMAC_SHA1, PRF_HMAC_TIGER, like so.

The authentication controller (110) is configured to generate a stratum security key for an access stratums (AS) security establishment or a non-access stratums (NAS) security establishment with the IAB donor device (200). In an embodiment, the stratum security key is an AS security key (a KSN or a KgNB or a S-KgNB) and a NAS security key (a KAMF) for the AS establishment and the NAS security establishment, respectively. In an embodiment, the stratum security key generator (111) generates the stratum security key for the AS security establishment and the NAS security establishment with the IAB donor device (200). In an embodiment, the stratum security key generator (111) configures the MT (140) to derive the stratum security key.

In an embodiment, the authentication controller (110) is configured to (100) perform the authentication with the core network for establishing a secure RRC connection with the core network, when the IAB relay device (100) connects to the IAB donor device (200) after a powering up or for initial registration/attach procedure. In response to a successful authentication, a secure RRC connection between the IAB relay device (100) and the core network is established for a secure exchange of the RRC messages.

Further, the authentication controller (110) is configured to generate the stratum security key in response to establishing the secure RRC connection. In an embodiment, the MT functionality (140) performs the authentication with the core network for establishing the secure RRC connection with the core network, when the IAB relay device (100) connects to the IAB donor device (200) after the powering up or for the initial registration/attach procedure. Further, the stratum security key generator (111) generates the stratum security key in response to establishing the secure RRC connection.

In another embodiment, the base station (300) provides a security key of the MT functionality (140) of the IAB relay device (100) to the IAB donor device (200), when the IAB relay device (100) connects to the IAB donor device (200) through a handover or as part of a Dual Connectivity procedure from the base station (300). Further, the authentication controller (110) is configured to generate the stratum security key in response to receiving the security key of the MT functionality (140). In an embodiment, the stratum security key generator (111) generates the stratum security key in response to receiving the security key of the MT functionality (140).

The authentication controller (110) is configured to generate a Pre-Shared Key (PSK) based on the stratum security key. Throughout this disclosure, the terms "PSK," "Pre-shared Secret Key" and "KIAB" are used interchangeably. In an embodiment, the PSK generator (112) generates the PSK based on the stratum security key. In an embodiment, the PSK generator (112) configures the MT (140) to derive the PSK. In an embodiment, the MT functionality (140) provides the PSK to the DU functionality (150) in response to generating the PSK. In an embodiment, the MT functionality (140) and the DU functionality (150) have an internal/proprietary interface depending on deployment scenarios, i.e., the MT functionality (140) and the DU functionality (150) are logically separated and can be physically either.

Similarly, the CU (210) and the DU (220) are also separated. In this scenario, the MT functionality (140) generates the PSK and provides to the DU functionality (150) by using the internal/proprietary interface or through a standardized interface, may be along with other parameters which are provided by the MT functionality (140) to the DU functionality (150) (for example, DU configurations received from the core network by the IAB-node-UE (via RRC) are provided to the IAB-node-DU).

In another embodiment, the DU functionality (150) sends a key request including a necessary information (e.g., address of CU (210)) to the MT functionality (140). When the PSK is not available with the MT functionality (140), the MT functionality (140) derives the PSK and provide the derived secret PSK to the DU functionality (150). In an embodiment, the PSK is generated using at least one parameter. The parameter includes the KSN, the KgNB, the S-KgNB, the KAMF, an IAB count, a physical cell identifier (PCI), an absolute radio frequency channel number-downlink (ARFCN-DL), a gNB identifier of the IAB donor device (200), an address of the CU (210) of the IAB donor device (200), an address of the IAB relay device (100), an identifier of the IAB relay device (100), a cell identifier, a key for user plane encryption (KUPenc), a key for user plane integrity (KUPint), an access type distinguisher, an uplink NAS count and other possible parameters.

The authentication controller (110) is configured to generate an internet key exchange (IKE) authentication (AUTH) value using the generated PSK for establishing the F1 interface security with the IAB donor device (200). In an embodiment, the IKE value generator (113) generate the IKE value using the PSK. In an embodiment, the IKE value generator (113) configures the DU (150) to derive the IKE value based on the PSK. Throughout this disclosure, the terms "IKE value," "IKEv2 value," "IKEv2 AUTH value" and "AUTH value" means the same and are used interchangeably. Further, the DU (150) establishes the F1 interface security with the IAB donor device (200) to support a flexible plug and play of IAB-node (100) and IAB-donor (200) by skipping heavy weighted EAP authentication procedures such as EAP-TLS, EAP-AKA etc. or authentication procedures that uses a pre-configured security credential like certificates, a (static) pre-configured PSK, etc. for optimizing the authentication at the IAB relay device (100).

In an embodiment, the DU (150) establishes the F1 interface security with the IAB donor device (200) by sending a first request to the IAB donor device (200). In an embodiment, the first request includes the AUTH value (which is generated using the PSK) or/and a global unique temporary identifier (GUTI). The IAB donor device (200) generates the PSK based on the stratum security key of the UE, which is generated for the AS security establishment, in response to receiving the first request from the IAB relay device (100). Further, the IAB donor device (200) verifies the received AUTH (as part of specified IKEv2 procedure) and if the verification is successful, then generates the IKE value using the PSK for establishing the F1 interface security with the IAB relay device (100). In an embodiment, the IAB donor device (200) uses the PSK as a shared secret/Master Session Key (MSK).

The IAB donor device (200) establishes the F1 interface security with the IAB relay device (100) by sending a second request to the IAB relay device (100), where the second request includes AUTH value and other parameters for an IPsec security association (SA) establishment.

In another embodiment, IAB donor device (200) sends a third request to the AMF (400) for the NAS security establishment, in response to receiving the first request from the IAB relay device (100). In an embodiment, the third request includes the GUTI. The AMF (400) identifies the stratum security key derived for the NAS security establishment based on the GUTI. Further, the AMF (400) generates the PSK based on the stratum security key for the NAS security establishment. Further, the AMF (400) sends the PSK to the IAB donor device (200). The IAB donor device (200) generates the IKE value using the PSK for establishing the F1 interface security with the IAB relay device (100), in response to receiving the PSK. The IAB donor device (200) establishes the F1 interface security with the IAB relay device (100) by sending the second request to the IAB relay device (100).

In another embodiment, the IAB relay device (100) and the IAB donor device (200) generates a dynamic PSK in order to perform a flexible plug and play of the IAB relay device (100) and the IAB donor device (200). The dynamic PSK is generated using parameters includes a Function Code (FC), for example FC=0x7F, an IP address of CU functionality (210), a length of the IP address of CU functionality (210), an IP address of the DU functionality (150) of the IAB relay device (100), and length of the IP address of the DU functionality (150). In an embodiment, the dynamic PSK generated at an output of the PSK generator (112) is a 256-bit data.

In an embodiment, the MT functionality (140) provides the stratum security key (e.g., KgNB) to the DU functionality (150) using the internal/proprietary interface or through the standardized interface. Further, the DU functionality (150) generates the PSK based on the stratum security key. In an embodiment, the MT functionality (140) provides an RRC related information (e.g., KgNB, PCI) to the DU functionality (150) by using the internal/proprietary interface for generating the PSK at the DU functionality (150).

In an embodiment, the DU functionality (150) sends a parameter request to the MT functionality (140) to trigger an IPsec authentication/re-authentication. The MT functionality (140) derives the PSK using the parameter request and provides requested parameters to the DU functionality (150) using the internal/proprietary interface or through the standardized interface.

In an embodiment, the IAB donor device (200) and the IAB relay device (100) stores the KIAB. The IAB donor device (200) uses the KIAB as the shared secret for performing IKEv2 procedure between the IAB donor device (200) and the IAB relay device (100). The KIAB and IPsec Security Association (SA) cryptographic keys are used for the establishment of the IPsec SA between the IAB donor device (200) and the IAB relay device (100). The KIAB remains valid as long as the IAB relay device (100) is connected to the IAB donor device (200) or until the IAB relay device (100) is re-authenticated. In an embodiment, the CU functionality (210) uses a security gateway (SEG), in order to terminate the IPsec tunnel. In this scenario, the CU functionality (210) generates the PSK and provides to the SEG by using the internal/proprietary interface or through a standardized interface.

The memory (120) may include non-volatile storage elements. Examples of such non-volatile storage elements may include magnetic hard discs, optical discs, floppy discs, flash memories, or forms of an electrically programmable memory (EPROM) or an electrically erasable and programmable memory (EEPROM).

In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In some examples, the memory (120) can be configured to store larger amounts of information than the memory (120). In certain examples, a non-transitory storage medium may store data that can, over time, change (e.g., in random access memory (RAM) or cache).

The processor (130) is configured to execute instructions stored in the memory (120). The communicator (160) is configured to communicate internally between hardware components in the IAB relay device (100). Further, the communicator (160) is configured to facilitate the communication between the IAB relay device (100) and other devices (i.e., the parent IAB relay devices, the IAB donor device (200), at least one User Equipment (UE)) in the wireless network (1000).

Although the FIG. 3 show the hardware components of the IAB relay device (100) but it is to be understood that other embodiments are not limited thereon. In other embodiments, the IAB relay device (100) may include less or more number of components. Further, the labels or names of the components are used only for illustrative purpose and does not limit the scope of the present disclosure. One or more components can be combined together to perform same or substantially similar function for the authentication at the IAB relay device (100).

Figure 4:
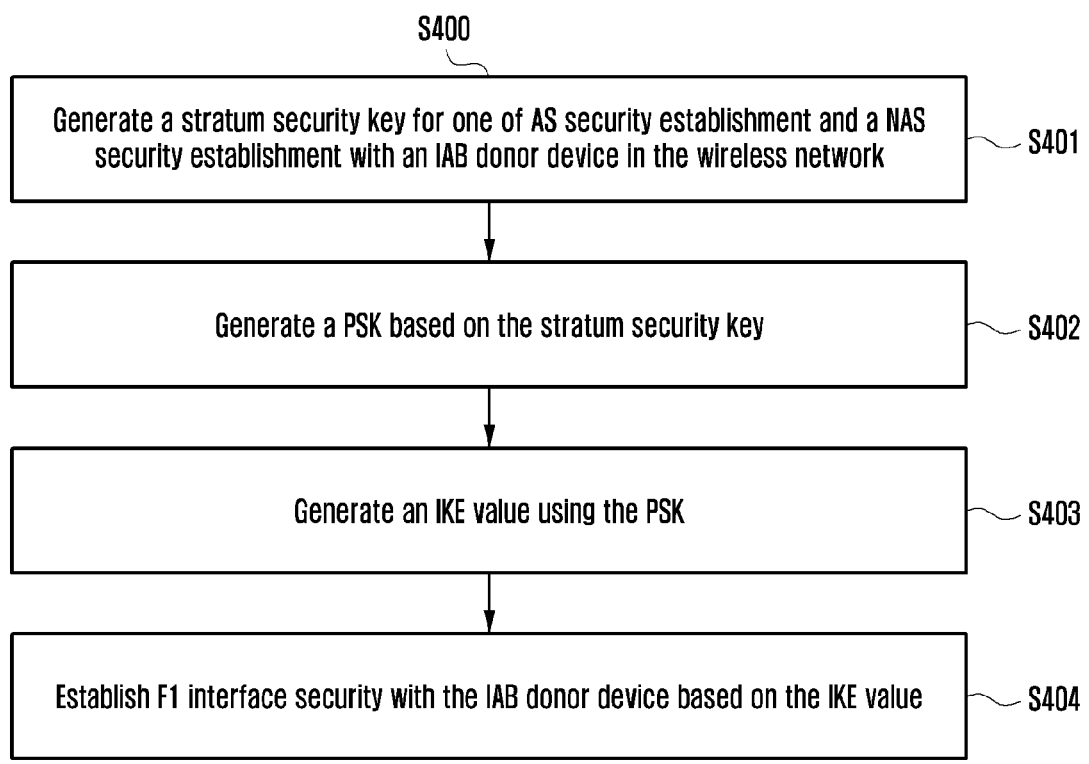
FIG. 4 illustrates a flow diagram of a method for generating and using the dynamic PSK for the authentication at the IAB relay device according to an embodiment as disclosed herein.

FIG. 4 illustrates a flow diagram S400 of a method for generating and using the dynamic PSK for the authentication at the IAB relay device (100), according to an embodiment as disclosed herein. At step S401, the method includes generating the stratum security key for one of the AS security establishment and the NAS security establishment with the IAB donor device (200) in the wireless network (1000). In an embodiment, the method allows the stratum security key generator (111) to generate the stratum security key for one of the AS security establishment and the NAS security establishment with the IAB donor device (200) in the wireless network (1000).

At step S402, the method includes generating the PSK based on the stratum security key. In an embodiment, the method allows the PSK generator (112) to generate the PSK based on the stratum security key. At step S403, the method includes generating the IKE value using the PSK. In an embodiment, the method allows the IKE value generator (113) to generate the IKE value using the PSK (as the shared secret). At step S404, the method includes establishing the F1 interface security with the IAB donor device (200). In an embodiment, the method allows the DU (150) to establish the F1 interface security with the IAB donor device (200).

The various actions, acts, blocks, steps, or the like in the flow diagram S400 may be performed in the order presented, in a different order or simultaneously. Further, in some embodiments, some of the actions, acts, blocks, steps, or the like may be omitted, added, modified, skipped, or the like without departing from the scope of the present disclosure.

Figure 5:
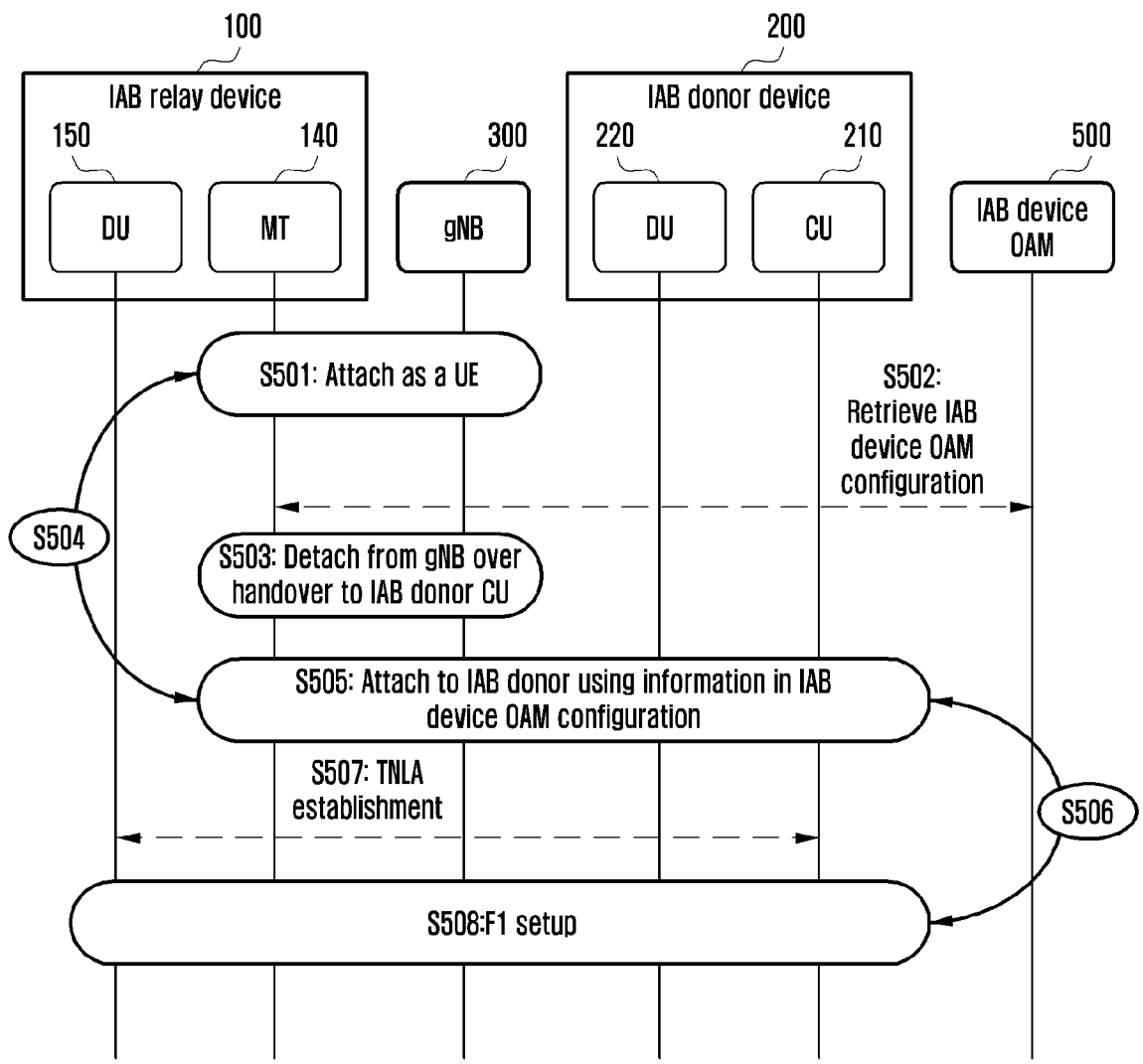
FIG. 5 illustrates a sequential diagram of signaling between components in the wireless network for establishing an F1 interface security by skipping an authentication procedure that uses a pre-configured security credential according to an embodiment as disclosed herein.

FIG. 5 illustrates a sequential diagram of signaling between the components in the wireless network (1000) for establishing the F1 interface security by skipping the authentication procedure that uses the pre-configured security credential, according to an embodiment as disclosed herein. At step S501, the MT (140) of the IAB relay device (100) attaches to the gNB (300, e.g., base station) as a typical UE by performing the RRC connection setup procedure. In response to successfully completing the RRC connection setup procedure, the MT (140) performs the authentication and generates the AS security key with the gNB (300). At step S502, the MT (140) retrieves an IAB device Operations, Administration and Maintenance (OAM) configuration from an IAB device OAM (500). The IAB device OAM configuration includes a transport network layer (TNL) address towards CU (210) and a list of cells supporting IAB device access. At step S503, the MT (140) detaches from the gNB (300) over handover for connecting to the CU (210) of the IAB donor device (200).

At step S504, the MT (140) functionality creates or establishes the AS security context as a part of a handover procedure, without performing the authentication procedure. At step S505, the MT (140) attaches to the CU (210) using information in the IAB device OAM configuration and performs the AS security establishment. There is no authentication procedure performed by the MT (140) functionality, but the AS security context is created/established, as part of handover procedure at step S504. At step S506, the MT (140) and CU (210) derives the PSK (i.e., KIAB), using the KgNB obtained at step S504.

Further, the MT (140) provides the PSK to the DU (150) at the step S506. At step S507, the DU (150) performs the transport network layer association (TNLA) establishment with the CU (210). At step S508, the DU (150) generates the IKEv2 AUTH payloads using the PSK (obtained at step S506) as specified in the internet key exchange protocol version 2 (IKEv2) IETF RFC and skips the authentication procedures which uses pre-configured security credentials like certificates, etc. for establishing the SA for the F1 interface (i.e., IPsec SA).

Similarly, at step S508, the CU (210) generates the IKEv2 AUTH payloads using the PSK (obtained at step S506) as specified in the Internet Key Exchange Protocol Version 2 (IKEv2) IETF RFC. In an embodiment, when the IAB relay device (100) connects to the IAB donor device (200) right after powering up at the step S505, due to, for example the handover procedure is not possible (i.e., step S504 is not possible), then the MT (140) functionality initiates initial registration procedure, performs the authentication with the core network via the IAB donor device (200), establishes the AS security context at step S505, and performs other subsequent steps. At step S506, the MT (140) and CU (210) derives the PSK (i.e., KIAB), using the KgNB generated at step S505.

Figure 6:
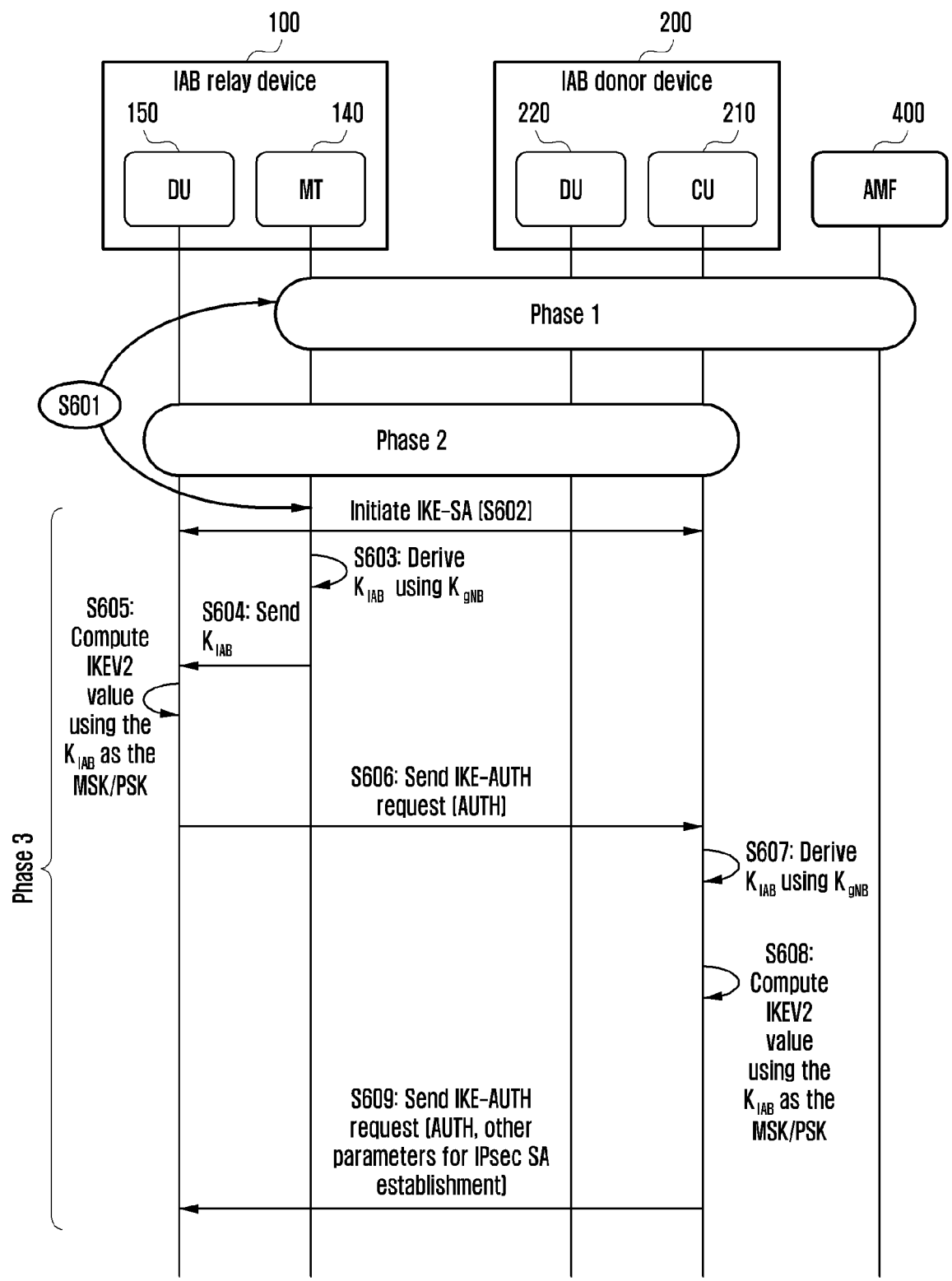
FIG. 6 illustrates a sequential diagram of signaling between components in the wireless network for establishing the F1 interface security when a stratum security key is an AS security key according to an embodiment as disclosed herein.

FIG. 6 illustrates a sequential diagram of signaling between the components in the wireless network (1000) for establishing the F1 interface security when the stratum security key is the AS security key, according to an embodiment as disclosed herein. Consider, the IAB relay device (100) is connecting to the AMF (400) via the IAB Donor device (200). At phase 1, the MT (140) of the IAB relay device (100) connects to the AMF (400) (i.e., the core network) as the typical UE by performing the RRC connection setup procedure with the CU (210) of the IAB donor device (200). Further, the MT (140) performs the authentication with the AMF (400) (i.e., the core network), the context management related to the IAB relay device (100) and configuring an access traffic-related radio bearer for the IAB relay device (100) at the RAN.

Further, the MT (140) optionally performs OAM connectivity establishment. At step S601, the MT (140) and the CU (210) derives the KgNB as the AS security key for the AS security establishment when the IAB relay device (100) registers with the AMF (400) in a new radio standalone (NR-SA) mode via the IAB Donor device (200). In an embodiment, the MT (140) and the CU (210) uses the S-KgNB as the AS security key for the AS security establishment between the IAB relay device (100) and the IAB Donor device (200) in a new radio non-standalone (NR-NSA) mode (i.e., evolved universal terrestrial radio access (E-UTRA)-NR dual connectivity (EN-DC)), where the MT (140) generates the S-KgNB, and CU (210) obtains the S-KgNB from the base station (300).

At phase 2, where Phase 2-1: backhaul RLC channel establishment, a backhaul RLC channel is established for a CP traffic in the phase 2. For example, F1-C messages (i.e., the messages sending through the F1 interface) transporting to and from the IAB relay device (100) are established in the phase 2-1. Phase 2-2: routing update, a backhaul adaptation protocol (BAP) layer is updated in the phase 2 to support routing between the IAB relay device (100) and the DU (220) of the IAB donor device (200).

Updating the BAP layer includes configuring a BAP routing identifier for routing in downstream direction on the DU (220) of the IAB donor device (200), and a BAP route identifier in upstream direction on the MT (140) of the IAB relay device (100). Further, routing tables are updated for all parent IAB relay devices and the DU (220) of the IAB donor device (200) with routing entries for the new BAP routing identifier. Further, the DU (150) of the IAB relay device (100) configures the IP address to establish the IP connectivity to the gNB (300).

At step S602 of the phase 3, the IAB relay device (100) initiates IKEv2 procedure with the CU (201) to establish the IPsec SAs. At step S603, the MT 140 derives the KIAB using the AS security key (e.g., KgNB or S-KgNB). At step S604, the MT (140) send the KIAB to the DU (150). At step S605, the DU (150) computes IKEV2 value using the KIAB as the MSK/PSK/shared secret, using the AUTH value generation mechanism specified in the IKEv2 IETF RFC. At step S605, the DU (150) send an IKE-AUTH request including the AUTH value (i.e., IKEv2 value) to the CU (210). At step S607, the CU (210) derives the KIAB using the AS security key (e.g., KgNB), in response to receiving the request. At step S608, the CU (210) computes the IKEV2 value using the KIAB corresponding to the UE as the MSK/PSK/shared secret and verifies the received AUTH value from the IAB relay device (100).

At step S609, the CU (210) sends IKE-AUTH request including the AUTH value (i.e., IKEv2 value generated using the KgNB by the CU (210), AUTH value generation is specified in the IKEv2 IETF RFC) and other parameters for the IPsec SA establishment, to the DU (150). Thus, the DU (150) initiates the setting up the F1-C connection (i.e., a link through the F1 interface) with the CU (201) of the IAB donor device (200) and establishes the security context to protect the F1 interface (i.e., F1-C interface and/or F1-U interface) by skipping the authentication procedures such as the EAP-TLS, the EAP-AKA, or which uses the pre-configured credential such as the certificate, the (static) pre-configured PSK etc. Further, the IAB relay device (100) allows the UE to connect after setting up the F1 interface security.

Figure 7:
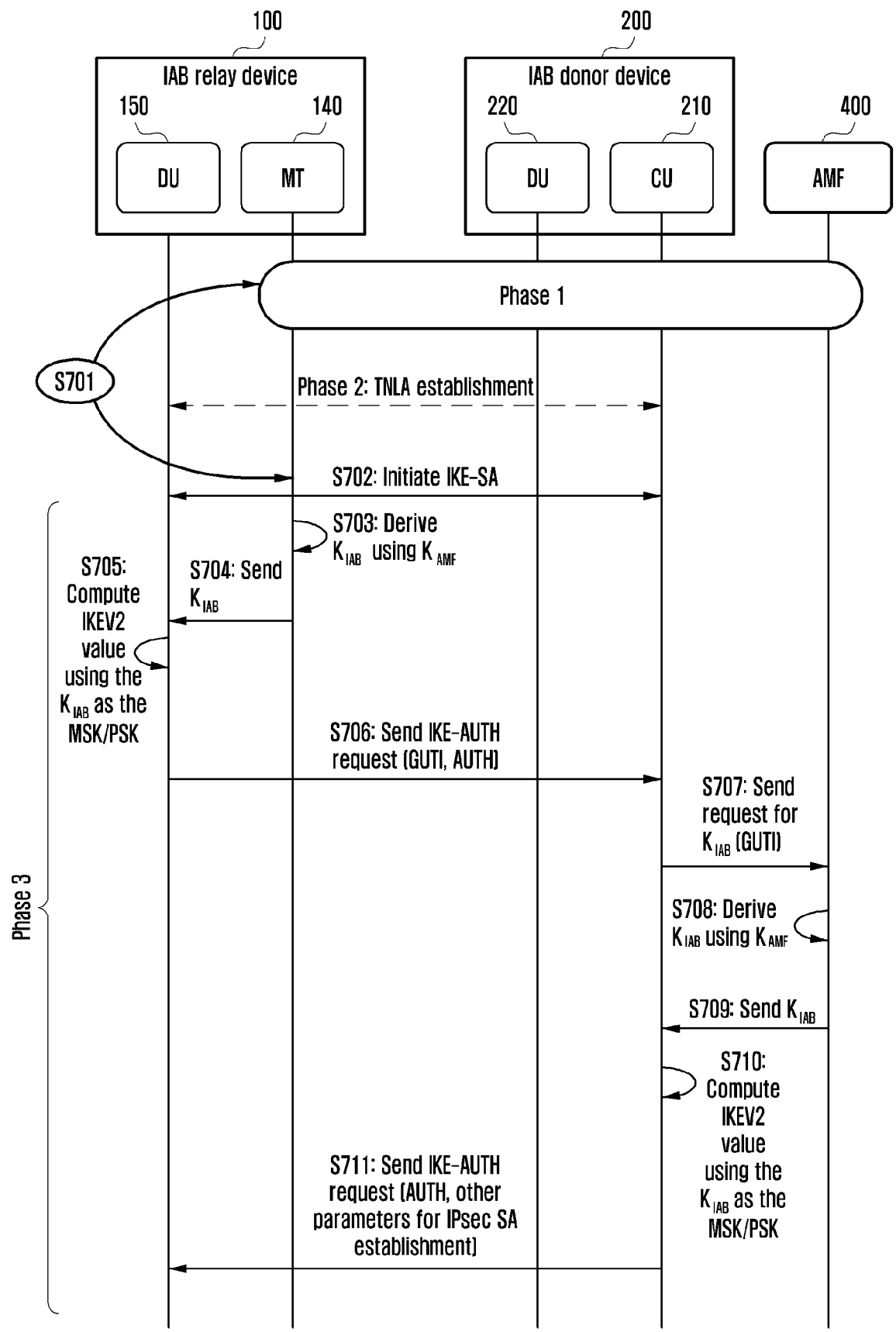
FIG. 7 illustrates a sequential diagram of signaling between components in the wireless network for establishing the F1 interface security when the stratum security key is a NAS security key according to an embodiment as disclosed herein.

FIG. 7 illustrates a sequential diagram of signaling between the components in the wireless network (1000) for establishing the F1 interface security when the stratum security key is the NAS security key, according to an embodiment as disclosed herein. Consider, the IAB relay device (100) is connecting to the AMF (400) via the IAB Donor device (200). At phase 1, the MT (140) of the IAB relay device (100) connects to the AMF (400) (i.e., the core network) as the typical UE by performing the RRC connection setup procedure with the CU (210) of the IAB donor device (200). Further, the MT (140) performs the authentication with the AMF (400) (i.e., the core network), the context management related to the IAB relay device (100) and configuring the access traffic-related radio bearer for the IAB relay device (100) at the RAN. Further, the MT (140) optionally performs the OAM connectivity establishment. At step S601, the MT (140) and the AMF (400) derives the KAMF as the NAS security key for the NAS security establishment.

At phase 2, where Phase 2-1: backhaul RLC channel establishment, the backhaul RLC channel is established for the CP traffic in the phase 2. For example, the F1-C messages (i.e., the messages sending through the F1 interface) transporting to and from the IAB relay device (100) are established in the phase 2-1. Phase 2-2: routing update, the BAP layer is updated in the phase 2-2 to support routing between the IAB relay device (100) and the DU (220) of the IAB donor device (200). Updating the BAP layer includes configuring the BAP routing identifier for routing in the downstream direction on the DU (220) of the IAB donor device (200), and the BAP route identifier in the upstream direction on the MT (140) of the IAB relay device (100).

Further, the routing tables are updated for all the parent IAB relay devices and the DU (220) of the IAB donor device (200) with the routing entries for the new BAP routing identifier. Further, the DU (150) of the IAB relay device (100) configures the IP address to establish the IP connectivity to the gNB (300). The IAB relay device (100) and the IAB donor device (200) performs the TLNA establishment in the phase 2.

At step S702 of phase 3, the IAB relay device (100) initiates IKEv2 procedure with the CU (201) to establish the IPsec SAs. At step S703, the MT 140 derives the KIAB using the NAS security key (e.g., KAMF). At step S704, the MT (140) send the KIAB to the DU (150). At step S705, the DU (150) computes IKEV2 value using the KIAB as the MSK/PSK/shared secret as specified in the IKEv2 IETF RFC. At step S706, the DU (150) sends the IKE-AUTH request including GUTI which is an optional parameter and the AUTH value (i.e., IKEV2 value) to the CU (210). At step S707, the CU (210) send the key request including the GUTI to the AMF (400).

At step S708, the AMF (400) derives the KIAB using the NAS security key (e.g., KAMF), in response to receiving the request. At step S708, the AMF (400) sends the KIAB to the CU (210) over a N2 interface. At step S710, the CU (210) computes the IKEv2 value using the KIAB as the MSK/PSK/shared secret as specified in the IKEv2 IETF RFC and verifies the received AUTH value from the IAB relay device (100).

At step S711, the CU (210) sends IKE-AUTH request including the AUTH value (i.e., IKEV2 value generated by the CU (210)) and other parameters for the IPsec SA establishment, to the DU (150). Thus, the DU (150) initiates the setting up the F1-C connection (i.e., a link through the F1 interface) with the CU (201) of the IAB donor device (200) and establishes the security context to protect the F1 interface (i.e., F1-C interface and/or F1-U interface) by skipping the authentication procedures such as the EAP-TLS, the EAP-AKA, or which uses at least one of the pre-configured credential such as the certificate, the (static) pre-configured PSK etc. Further, the IAB relay device (100) allows the UE to connect after setting up the F1 interface security.

FIG. 8 illustrates example scenarios of generating the PSK using various parameters, according to an embodiment as disclosed herein. In an example, the PSK (i.e., KIAB) is generated using the KSN/KgNB, a parameter distinguisher (e.g., 0x00 or 0x07 or 0xEF or other possible values), and a parameter identifier (e.g., 0100 or 1111 or other possible values as shown in notation (a) of FIG. 8. In another example, the PSK (i.e., KIAB) is generated using the KSN/KgNB along with at least one of the following: the IAB count, the PCI, the ARFCN-DL, the gNB identifier of the IAB donor device (200), the address of the CU (210) of the IAB donor device (200), the address of the DU (150) of the IAB relay device (100), the identifier of the IAB relay device (100), and the other possible parameters (e.g., length of the parameter) as shown in notation (b) of FIG. 8.

In another example, the PSK (i.e., KIAB) is generated using the KAMF, the access type distinguisher, and the uplink NAS count as shown in notation (c) of FIG. 8. In another example, the PSK (i.e., KIAB) is generated using the key for the user plane integrity (KUPint) as shown in notation (d) of FIG. 8. In another example, the PSK (i.e., KIAB) is generated using the key for the user plane encryption (KUPenc) as shown in notation (e) of FIG. 8.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claims is:

1. A method performed by an integrated access and backhaul (IAB) relay device in a wireless network, comprising:
    generating, by the IAB relay device, a stratum security key for an access stratum security establishment with an IAB donor device;
    generating, by the IAB relay device, a pre-shared key (PSK) based on the stratum security key; and
    establishing, by the IAB relay device, an F1 interface security with the IAB donor device based on an internet key exchange (IKE) value using the PSK.

2. The method as claimed in claim 1, wherein the stratum security key is a key for an access stratum (AS) security establishment.

3. The method as claimed in claim 2, wherein the key for the AS security establishment is a KgNB or a S-KgNB.

4. The method as claimed in claim 1, wherein the PSK is generated based on at least one of an address of a control unit (CU) of a IAB donor device, an address of a distribution unit (DU) of the IAB relay device, a length of the address of the CU of the IAB donor device, or a length of the address of the DU of the IAB relay device.

5. The method as claimed in claim 1, wherein the PSK is a 256-bit data.

6. The method as claimed in claim 1, wherein establishing the F1 interface security with the IAB donor device comprises;
    generating, by the IAB donor device, the stratum security key for an AS security establishment;
    generating, by the IAB donor device, the PSK based on the stratum security key; and
    generating, by the IAB donor device, the IKE value using the PSK.

7. The method as claimed in claim 1, further comprising storing the PSK.

8. The method as claimed in claim 1, wherein the PSK remains valid as long as the IAB relay device is connected to an IAB donor device or until the IAB relay device is re-authenticated.

9. An integrated access and backhaul (IAB) relay device, comprising:
    a memory;
    a processor coupled to the memory; and
    an authentication controller, coupled to the processor and the memory, configured to:
        generate a stratum security key for a stratum security establishment with an IAB donor device;
        generate a pre-shared key (PSK) based on the stratum security key; and
        establish an F1 interface security with the IAB donor device based on an internet key exchange (IKE) value using the PSK.

10. The IAB relay device as claimed in claim 9, wherein the stratum security key is a key for an access stratum (AS) security establishment.

11. The IAB relay device as claimed in claim 10, wherein the key for the AS establishment is a KgNB or a S-KgNB.

12. The IAB relay device as claimed in claim 9, wherein the PSK is generated based on at least one of an address of a control unit (CU) of a IAB donor device, an address of a distribution unit (DU) of the IAB relay device, a length of the address of the CU of the IAB donor device, or a length of the address of the DU of the IAB relay device.

13. The IAB relay device as claimed in claim 9, wherein the PSK is a 256-bit data.

14. The IAB relay device as claimed in claim 9, the authentication controller is further configured to store the PSK.

15. The IAB relay device as claimed in claim 9, wherein the PSK remains valid as long as the IAB relay device is connected to an IAB donor device or until the IAB relay device is re-authenticated.

* * * * *